United States Patent [19]

Renfrew

[11] 4,016,153
[45] Apr. 5, 1977

[54] MONOAZO DYESTUFF MIXTURES DERIVED FROM 2-AMINO-5-NITRO-THIAZOLE AND BIS-HYDROXYALKYLAMINO ACKLANILIDES REACTED WITH ACID HALIDES AND AMIDES

[75] Inventor: Edgar E. Renfrew, Flemington, Pa.

[73] Assignee: American Color & Chemical Corporation, Charlotte, N.C.

[22] Filed: Dec. 13, 1974

[21] Appl. No.: 532,398

Related U.S. Application Data

[63] Continuation-in-part of Ser. No. 378,003, July 10, 1973, abandoned.

[52] U.S. Cl. .................. 260/158; 260/456 A; 260/463; 260/475 P; 260/476 R; 260/490

[51] Int. Cl.² ............ C09B 29/08; C09B 29/26; C09B 43/18

[58] Field of Search .................................. 260/158

[56] References Cited

UNITED STATES PATENTS

| 2,683,708 | 7/1954 | Dickey et al. | 260/158 |
|---|---|---|---|
| 2,683,709 | 7/1954 | Dickey et al. | 260/158 |
| 3,069,408 | 12/1962 | Merian et al. | 260/158 |
| 3,097,198 | 7/1963 | Fishwick et al. | 260/158 X |

FOREIGN PATENTS OR APPLICATIONS

| 1,223,137 | 2/1971 | United Kingdom | 260/158 |

*Primary Examiner*—Charles F. Warren
*Attorney, Agent, or Firm*—Armstrong, Nikaido & Marmelstein

[57] ABSTRACT

Azo dyes are provided and are the reaction product of diazotized 2-amino-5-nitrothiazole and a coupling component of the formula:

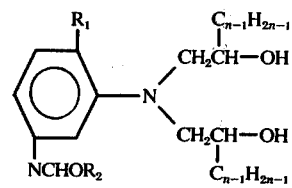

wherein
 $R_1$ is hydrogen or lower alkoxy;
 $R_2$ is alkyl of 1-4 carbons, phenyl, tolyl or chlorophenyl;
 $n$ is 1 or 2;
the hydroxy alkyl groups being reacted prior or subsequent to coupling with at least stoichiometric qualities of certain acid halides and a mono- or di-lower alkyl formamide or acetamide.

The resultant azo dye produces excellent dyeings on polyester fabric materials.

5 Claims, No Drawings

MONOAZO DYESTUFF MIXTURES DERIVED FROM 2-AMINO-5-NITRO-THIAZOLE AND BIS-HYDROXYALKYLAMINO ACKLANILIDES REACTED WITH ACID HALIDES AND AMIDES

This application is a continuation-in-part application of Ser. No. 378,003, filed July 10, 1973, now abandoned.

BACKGROUND OF THE INVENTION

A large number of patents have reported the preparation of monoazo dyestuffs from heterocyclic amine bases which are diazotized and reacted with an N-substituted aniline coupler. Some patents describe couplers containing N-hydroxyalkyl substitution, such as Dickey, U.S. Pat. No. 2,683,708. Although some of te compounds have been satisfactory for the dyeing of various cellulose acetate fibers, it has been found that the fastness properties of such dyestuffs are inadequate for use on polyester.

In accordance with the invention, I have discovered a new dyestuff mixture providing excellent blue dyeings on polyester fibers, particularly polyethylene terephthalate.

SUMMARY OF THE INVENTION

In accordance with our invention, a monoazo dyestuff is provided which consists essentially of the reaction product of:
a. diazotized 2-amino-5-nitrothiazole and;
b. a coupling component of the formula;

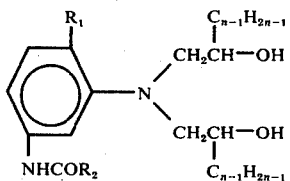

wherein $R_1$ is hydrogen or lower alkoxy, and $R_2$ is alkyl of 1–4 carbon atoms or phenyl, tolyl or chlorophenyl and $n$ has a value of 1 or 2.

The hydroxyalkyl groups of the coupling component are reacted either before or after coupling with at least stoichiometric quantities of both (1) a strong acid halide such as an alkylchlorocarbonate, acylhalide, alkylsulfonylchloride, arylsulfonylchloride and thionylchloride and (2) a mono- or di-N-substituted lower alkyl formamide or acetamide at an elevated temperature of 30° to 100° C. until the reaction mixture is substantially free of unreacted coupling component.

DETAILED DESCRIPTION OF THE INVENTION

As stated above, the modification of the hydroxyalkyl groups of the coupling component can be acomplished either before or after coupling. A coupling component modified prior to coupling is useful per se in the preparation of dyes by merely coupling the modified component with any diazotized amine capable of coupling in an acid medium.

The coupling component may be modified according to the method of the invention by dissolving it in one of the designated amides, which is conveniently used in the reaction as a solvent as well as a reactant, and adding thereto at least a stoichiometric quality (two moles based on the hydroxyalkyl groups in the coupler) and preferably a 25–50 percent excess over the stoichiometric amount, of the strong acid halide. The use of the amide as a solvent obviously provides a sufficient amount, based on the coupler, of N-substituted amide. It is possible, of course, although less convenient, to add the N-substituted amide in at least a stoichiometric quantity and conduct the reaction in an inert medium, such as dioxane.

The reaction is run at a temperature between 30° and 100° C. and is continued for several hours until unreacted dihydroxyalkyl compound is substantially absent from the reaction mixture. The reaction time will vary with the temperature and for this reason it is preferable to use higher temperatures of, for example, 60°–100° C. to complete the reaction in an acceptable amount of time. The degree of completion of the reaction can be determined easily by an examination of the product. If there is a substantial amount of dihydroxyalkyl component in the final product, the light fastness of the insufficiently reacted product, as determined by accelerated laboratory testing methods, is markedly inferior to a completely reacted product. The entry of the amide into the reaction facilitates the elimination of unreacted dihydroxyalkyl compound.

Thin-layer chromatographic analysis verifies the fact that the dyestuffs prepared according to the invention are complex mixtures. The thin-layer-chromatographic analysis technique separates the dyestuff into its various components. A suitable technique is to first prepare a 5% solution of the dyestuff in acetone. Four microliters of that solution is spotted on a glass plate on which had been previously cast a 250 micron layer of silica gel. After drying, the spot is eluted with a 4/1 by volume benzene/acetone solution. As the dyestuff spot migrates vertically up the plate the various components of the dyestuff separate. That is, depending upon factors such as polarity and relative solubility in the elution liquid, each component will migrate to a different height on the plate. In that manner, it can be verified that dyestuffs prepared according to the method of the invention are complex mixtures. The chromatographs also show that the amide enters into the reaction, and that the mixtures are of the same composition, regardless of which of the designated amides and other reactants are employed to modify the hydroxyalkyl groups of the coupling component.

Suitable formamides and acetamides are N,N-dimethylformamide, N,N-dimethylacetamide, N,N-diethylacetamide, N,N-diethylformamide, N,N-di-t-butylformamide and N-mono-t-butylformamide.

Examples of suitable carboxylic acid halides useful in the process of the invention are ethylchlorocarbonate, methylchlorocarbonate, t-butylchlorocarbonate, acetyl chloride, propionyl chloride, benzoyl chloride, methylbenzoyl chloride, ethylbenzoyl chloride, phthaloyl chloride, terephthaloyl chloride, isophthaloyl chloride and butyryl chloride. Illustrative of useful sulfonylchlorides are benzene sulfonylchloride toluene sulfonylchloride, methane sulfonylchloride and t-butylsulfonylchloride. As used herein lower alkyl is intended to mean alkyl of up to 6 carbon atoms.

As noted above, the coupling can be carried out either before or after the modification of the coupling component. The coupling reaction is carried out in the conventional manner at 0°–5° C. in an aqueous acid medium, with or without the use of an acid-binding agent, such as sodium acetate. After the coupling reaction, the precipitated monoazo dyestuffs are filtered off and washed.

Diazotization of the 2-amino-5-nitrothiazole is carried out, for example, by stirring the diazotizable amine to solution in concentrated sulfuric acid at 20°–25° C. and adding nitrosyl sulfuric acid thereto to form the diazo compound, which is held for the coupling step.

Dyestuffs prepared according to the invention may be standardized either as a disperse paste or a disperse powder by any of the basic standardizing techniques that have been known to the art for many years, i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste is cut or standardized to a standard strength with a diluent, such as sodium sulfate or dextrin. As noted above, any conventional wetting agent, e.g., sodium cetyl sulfonate, may be added to wet out the product. The final color content of the finished paste averages from 10–40 percent by weight (pure color) active dyestuff base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25–60% by weight color content (pure color).

The dyestuffs are applied by known methods for dyeing polyesters, either in a dispersion with a carrier at 50°–100° C or without a carrier at 100°–150° C under pressure. Printing and padding are carried out in the presence of suitable thickening agents followed by fixation at high temperatures with or without steam. The novel dyestuffs produce uniform shades over a temperature range of 180°–220° C when applied by the Thermosol process.

The invention is further illustrated by the following examples:

EXAMPLE I

A diazo solution is prepared by charging to a 500 ml. flask 220 g. 94 percent sulfuric acid and adding thereto at 20°–25° C 85.0 g. 2-amino-5-nitrothiazole. The mixture is stirred in solution and maintained at 20°–25° C. There is then added dropwise 50 g. nitrosyl sulfuric acid below 25° C. The resulting diazo solution is stirred for about 12 hours at about 20°–25° C and held for the coupling reaction.

EXAMPLE II

To a 500 ml. flask there is charged 56.5 g. of 3-[bis(-hydroxyethyl)amino]4-ethoxyacetanilide (0.2 mole) and 85 g. of dimethylformamide. The mixture is heated to 65°–70° C then cooled to 5°–10° C. A 4 g. quantity of pyridine (about 5 percent, based upon the amount of dimethylformamide) is added thereto. At a temperature between 5° and 10° C there is added dropwise 60 g. of ethyl chlorocarbonate. After the addition of the ethyl chlorocarbonate, the solution is allowed to come to room temperature and stirred overnight. It is then heated to 75° C, cooled to room temperature and poured into 1200 g. of ice and water containing 30 g. of 20° Baume hydrochloric acid.

EXAMPLE III

To the resulting slurry of Example II is added 275 g. of the above-prepared diazo solution of Example I at a temperature below 5° C. The reaction mixture is allowed to reach room temperature over a period of 5 hours. The product is separated by filtration, washed with cold water, reslurred in a 1 percent soda ash solution, and stirred at room temperature overnight. The slurry is filtered and washed in cold water to give a wet cake weighing 346.7 g. (30 percent solids). A thin layer chromatogram of the dye shows it to have a complex mixture component.

EXAMPLE IV

A dispersion is prepared containing 12.75 percent of the dye of Example III and 37.25 percent sodium lignin sulfonate dispersant together with a small amount of glycerin and enough water to bring the solids content of the solution to 50 percent by weight. The paste is then milled until the dyestuff is sufficiently dispersed.

An aqueous solution of one percent by weight of monosodium phosphate and twenty percent by weight based on the weight of fabric dyed, of a commercially available phenolic carrier is prepared. The resulting solution is heated to 120° F. and 10 g. of Dacron polyester fabric is added thereto. The temperature is maintained for 10 minutes and 2 percent by weight of the dyestuff paste prepared as described above is added to the bath. The resulting dye bath is heated at 208° F. and maintained at this temperature for 90 minutes. The dyed fabric is removed and after-soaped by working it in a 1 percent soap solution at 180° F. for 10 minutes. It is then rinsed and dried. The dyeing is a bright blue characterized by being fast to light and having good sublimation properties.

EXAMPLE V

To a 500 ml. flask there is charged 100 cc. dimethylformamide and 56.5 g. 3-[bis(hydroxyethyl)amino]4-ethoxybenzanilide (0.2 mole). The mixture is heated to 60°–65° C and then cooled. At 5°–10° C over a period of 1 hour there is added 44 g. ethyl chlorocarbonate (0.2 mole). The mixture is held at room temperature for 6 hours. 15 grams additional ethyl chlorocarbonate (33 percent excess) is added and the mixture is heated to 75° C and held for ½ hour. The reaction mixture is drowned in 1200 g. ice water containing 30 g. 20° Baume hydrochloric acid.

EXAMPLE VI

The product of Example V is coupled with the base prepared as in Example 1 by adding 260 g. diazo solution dropwise at 0°–5° C. The reaction mixture is agitated overnight and the product is separated by filtration and washed with water. The press cake is reslurred with 50 g. soda ash, filtered, and washed with water at 50° C. There is thus obtained 387 g. wet cake having a solids content of 26 percent. The product is dispersed in the manner of Example IV, and dyed by the method of that Example. The dyeings are reddish-blue in hue, and are characterized by the same excellent sublimation and good light fastness.

EXAMPLE VII

The procedure of Example V is substantially repeated with the exception that an equivalent amount of 3-[bis(hydroxyethyl)amino]benzanilide is used in place of 3-[bis(hydroxyethyl) amino]4-ethoxybenzanilide. After coupling in accordance with Example VI, a mixture with the dyeing properties comparable to Example VI is obtained, the color however, being a bluish-violet shade.

EXAMPLE VIII

By substituting diethylformamide for the dimethylformamide in Example II and coupling with the product of Example I as in the procedure of the preceding examples, dyes of similar performance characteristics are obtained.

EXAMPLE IX

A reddish blue dyestuff having excellent affinity, good light fastness, and excellent sublimation properties is prepared from 3-[bis(2-hydroxypropyl)amino]4-methoxyacetanilide (modified as in Example II) and the diazonium material of Example I by employing the coupling procedure of Example III and the dispersing method of Example IV.

EXAMPLE X

To a 500 cc. flask equipped with mechanical agitator and thermometer is charged 150 cc. of N,N-dimethylformamide and 70.5 grams m-[bis(2-hydroxyethyl)amino]acetanilide. The mixture is heated with stirring to 70° to 75° C and then cooled to 10° C. To the mixture is added 4 cc. of pyridine followed by a dropwise addition of 25 grams ethyl chlorocarbonate. The mixture is heated with stirring to 65°–70° C and held at that temperature for 1 hour, after which time it is drowned into 500 cc. ice water. The solution of coupler so obtained is treated in the manner of Example III with the diazonium material of Example I. After 5 hours stirring at 0°–5° C, the product of the coupling is isolated by filtration, and washed substantially acid-free with cold water. The press cake is reslurred in 200 cc. of a 1% soda ash solution, filtered and washed with water. The wet press cake (134.5 grams) contains 54 grams of pure dye melting at 170°–175° C. The dye is standardized in a manner similar to that of Example IV and dyed on 10 grams of Dacron polyester fabric in the manner of Example IV. The dyed fabric is violet in hue and has similar properties to the dye of Example IV. The dyeing is characterized by excellent sublimation and fastness and very good light fastness.

EXAMPLE XI

The procedure of Example X is repeated with the exception that 24 grams of methanesulfonyl chloride are used in place of the ethyl chlorocarbonate. A dye similar to that of Example X with excellent properties is prepared. Thin layer chromatography shows the dye to be the same as that of Example X.

EXAMPLE XII

The procedure of Example X is repeated with the exception that 39 g. benzenesulfonyl chloride is used in place of the ethyl chlorocarbonate. Thin layer chromatograms show the dye to be the same as that of Example X.

EXAMPLE XIII

The procedure of Example X is repeated with the exception that 27 grams of benzoyl chloride is used in place of the ethyl chlorocarbonate. Thin layer chromatograms show the dye to be the same as that of Example X.

EXAMPLE XIV

The procedure of Example X is repeated with the exception that 25 grams of butyrylchloride is used in place of the ethyl chlorocarbonate. A thin layer chromatogram shows the dye to be the same as that of Example X.

EXAMPLE XV

The procedure of Example X is repeated with the exception that 27 grams of thionyl chloride is used in place of the ethyl chlorocarbonate. Thin layer chromatograms show that the dye prepared is the same as that of Example X.

EXAMPLE XVI

The procedure of Example II is repeated with the exception that 200 cc. of N,N-dimethylacetamide is used in place of the N,N-dimethylformamide. A dye from the diazo of Example I and the coupler so prepared is made by the method of Example III. Thin layer chromatograms show the dye to be essentially the same as that of Example III. A dispersion made by the method of Example IV, when dyed on polyester fabric, showed essentially the same shade and properties as the product of Example IV.

EXAMPLE XVII

The procedure of Example II is repeated with the exception that 150 cc. of N-t-butylformamide is used in place of the N,N-dimethylformamide. Coupling in the manner of Example III with the diazo prepared as in Example I, yielded a product essentially identical with that of Example III, as shown by thin layer chromatograms and by dispersing and dyeing as described in Example IV.

EXAMPLE XVIII

To a beaker containing 56.5 g. 3-[bis(hydroxyethyl) amino]4-ethoxyacetanilide (0.2 mole) dissolved in 1,000 ml. ice and water containing 50 ml. 20° Baume hydrochloric acid, is added a diazonium solution prepared as in Example 1. The coupling is allowed to stir at 0°–5° C for 5 hours, and for 16 more hours, during which time the temperature is allowed to rise to that of the room. The product, which has the structure

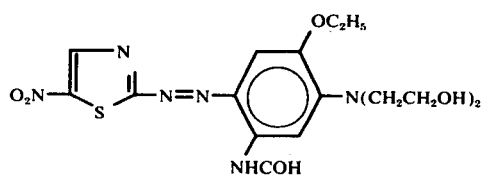
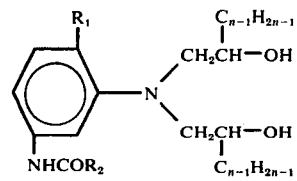

is isolated by filtration, washed acid free with water, and dried. The cake is charged to a 500 ml. flask equipped with a heater, stirrer and thermometer and containing 200 g. N,N-dimethylformamide. The mass while stirring is heated to 75° C, then cooled by external means to 10° C. To this mass is added 40 g. pyridine followed dropwise by 25 g. ethyl chlorocarbonate. The mixture is heated while stirring to 70° C and held at that temperature for 1 hour after which time it is drowned into 500 ml. cold water. The cake is isolated by filtration, washed substantially acid free and dried. The cake is reslurried in 200 ml 1% sodium carbonate solution, filtered and washed with water.

The material so obtained may be dried, or it may be charged as presscake to a ball-mill and dispersed with a suitable lignin sulfonic acid dispersant as described in Example IV. Dyeings made as described in Example IV exhibit the same clear shade and good properties as do the dyeings produced in Example IV.

What is claimed is:

1. The monoazo dye mixture consisting essentially of the reaction product of
    a. diazotized 2-amino-5-nitrothiazole; and
    b. a coupling component of the formula wherein
   $R_1$ is hydrogen or lower alkoxy;
   $R_2$ is alkyl of 1–4 carbon, phenyl, tolyl or chlorophenyl; and
   $n$ is 1 or 2;
the hydroxyalkyl groups of the coupling component being reacted prior to or subsequent to coupling with at least stoichiometric quantities of both:
   1. a lower alkyl chlorocarbonate, acetyl chloride, propionyl chloride, benzoyl chloride, methylbenzoyl chloride, ethylbenzoyl chloride, phthaloyl chloride, terephthaloyl chloride, isophthaloyl chloride, butyryl chloride, a lower alkylsulfonylchloride, an arylsulfonylchloride or thionyl chloride, and
   2. a mono- or di-lower alkyl formamide or acetamide, at a temperature of 30°–100° C. until the reaction mixture is substantially free of unreacted coupling component.

2. The dyestuff of claim 1 wherein the compound (1) is ethyl chlorocarbonate and the formamide is dimethylformamide.

3. The monoazo dyestuff of claim 1 wherein said hydroxyalkyl groups of said coupling component are reacted with at least stoichiometric quantities of said lower alkyl chlorocarbonate.

4. A dyestuff of claim 1 wherein said coupling component is treated with said lower alkyl chlorocarbonate and dimethylformamide at a temperature of 60°–100° C.

5. A dyestuff according to claim 4 wherein said lower alkyl chlorocarbonate is ethyl chlorocarbonate.

* * * * *